May 4, 1965 R. C. O'DELL ETAL 3,181,757
APPARATUS FOR FABRICATING GLASS
Filed Dec. 19, 1962 4 Sheets-Sheet 1

INVENTORS
RICHARD C. O'DELL and
LARRY A. CRUM
BY
Oscar H. Spencer
ATTORNEY

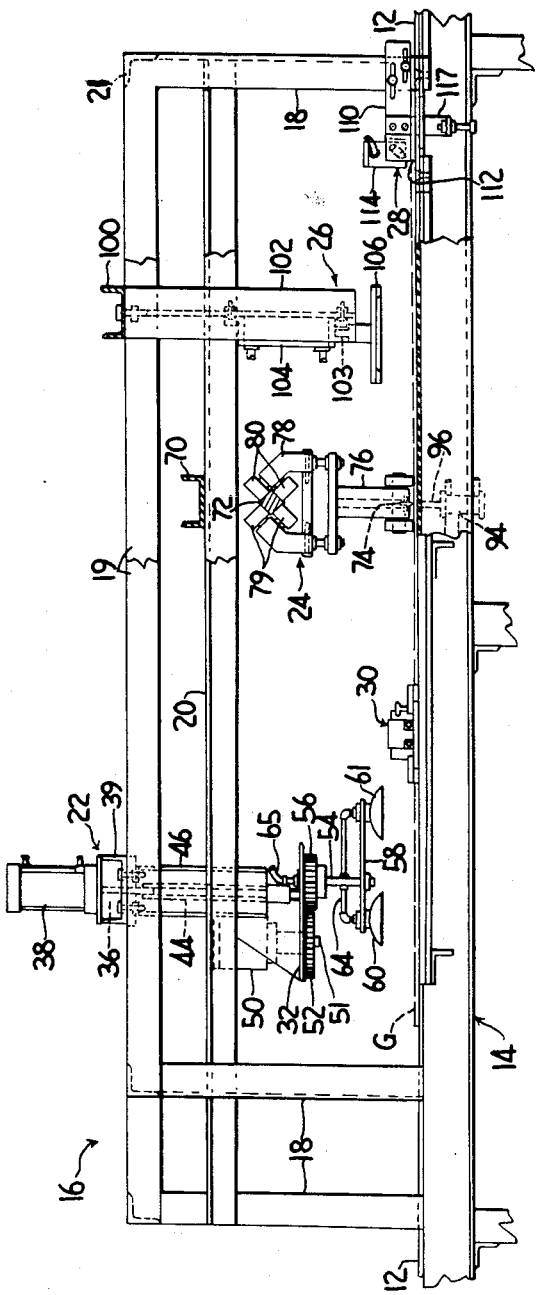

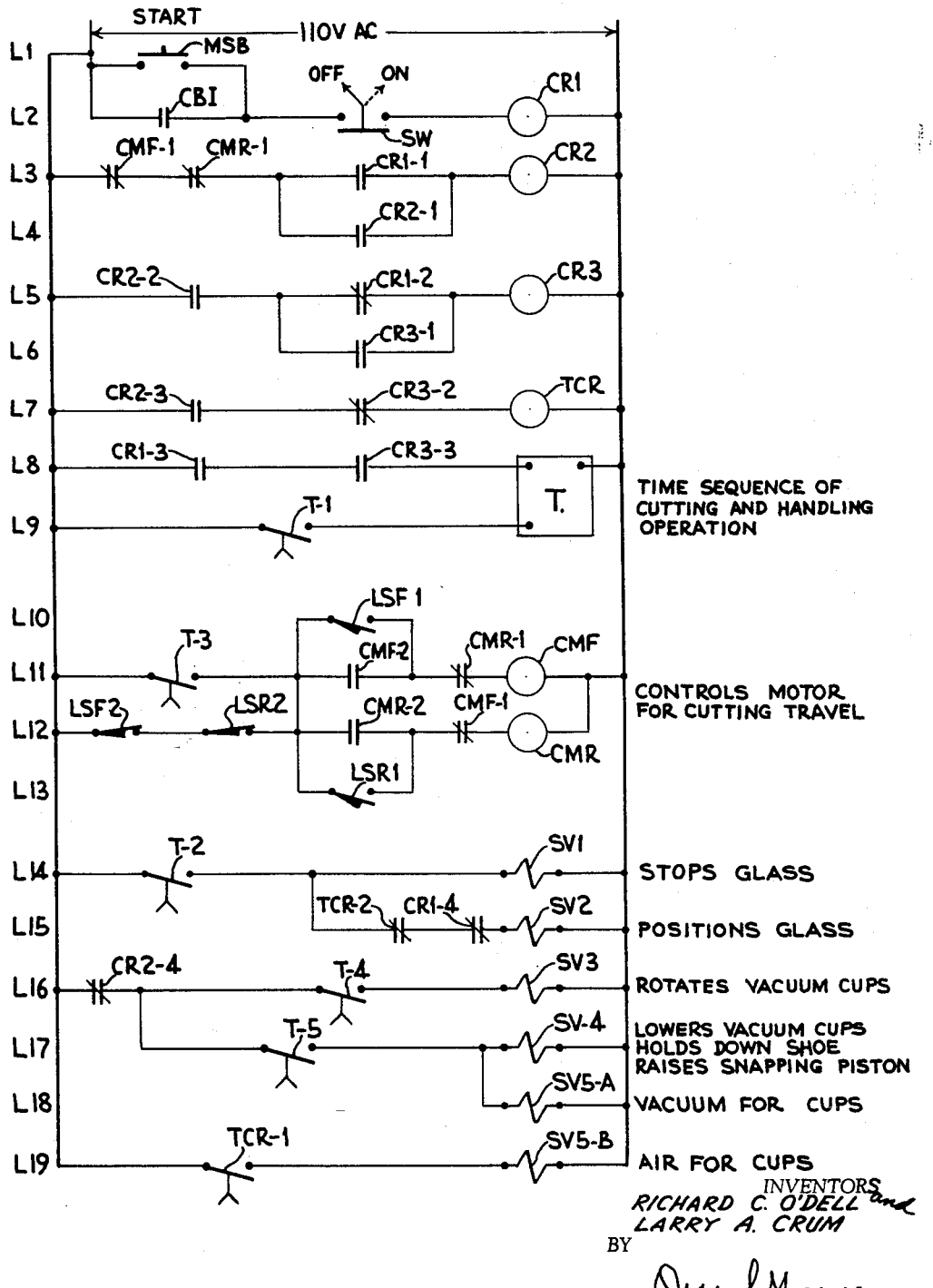

FIG. 5

| ILLUSTRATIVE REFERENCE CHARACTER | SYMBOL | TYPE OF UNIT |
|---|---|---|
| CR1 | —◯— | COIL OF RELAY |
| TCR | —◯— | PNEUMATIC TIME DELAY COIL |
| CMR, CMF | —◯— | MOTOR STARTER COILS |
| SV1 | —⋀— | SOLENOID OF SOLENOID OPERATED VALVE |
| T | [T] | MOTOR DRIVEN SEQUENCE TIMER |
| CR1-1 CBI | —\|\|— | NORMALLY OPEN CONTACT |
| CRI-1 | —⫲— | NORMALLY CLOSED CONTACT |
| T-1 TCR-1 | —⋏— | NORMALLY OPEN, TIMER CONTROLLED CONTACT |
| LSF1, LSR1 | —⋅╲⋅— | NORMALLY OPEN, TRIPPED CLOSED, LIMIT SWITCH |
| LSF1, LSR1 | —⋅╱⋅— | NORMALLY CLOSED, TRIPPED OPEN, LIMIT SWITCH |
| MSB | —⋅⊥⋅— | MANUAL START BUTTON |
| SW | —⋅Y⋅— | MANUAL SWITCH |

INVENTORS
RICHARD C. O'DELL and
LARRY A. CRUM
BY
*Oscar L. Spencer*
ATTORNEY

United States Patent Office 3,181,757
Patented May 4, 1965

3,181,757
APPARATUS FOR FABRICATING GLASS
Richard C. O'Dell, Crestline, and Larry Allen Crum, Bucyrus, Ohio, assignors to Pittsburgh Plate Glass Company, Pittsburgh, Pa., a corporation of Pennsylvania
Filed Dec. 19, 1962, Ser. No. 245,797
10 Claims. (Cl. 225—96.5)

This invention relates to the cutting and handling of glass sheets or plates, particularly in preparation for further fabricating operations in the manufacture of such finished products as automotive side lites and ventilator windows.

In the manufacture of these finished products, a large sheet of glass is normally cut to provide smaller sections approximating the size of the finished product. These smaller sections are then further processed, as by cutting them to the desired pattern, seaming or otherwise finishing one or more edges and then tempering.

In many instances, the shape of the finished product is such that a significant quantity of glass can be conserved by nesting the ultimate patterns on a larger sheet of glass so that two blocks (i.e., portions out of which a finished shape or pattern will be cut) may be obtained from the sheet where only one would otherwise fit. This is particularly the case where triangular or trapezoidal shapes are desired. If one of two such similarly shaped pieces is rotated so as to be oriented at 180 degrees to the other, a more proximate positioning or nesting of the two pieces is facilitated, thereby permitting two such shapes to be cut out of a rectangular sheet of smaller dimensions than would otherwise be required. In addition, quantities of glass that would otherwise be wasted are utilized.

The present invention facilitates the cutting and handling of large glass sheets of double block size out of which two nested block sheets are to be obtained. Broadly, this is accomplished by conveying a double block size sheet of glass into a cutting and handling station of a fabricating line, and properly located, scoring and breaking the double block size glass sheet along a diagonal line across the sheet and between the nested portions of the patterns of each block. Thereafter, to permit the use of a single pattern cutter and a single edge seamer for each block size glass sheet, one of the separated pieces is automatically lifted from the conveying means, rotated 180 degrees and then replaced. Because both pieces are then oriented in the same relative position, each piece may be treated in a like manner throughout the remainder of the fabricating process.

These and other features of this invention will be readily appreciated as the same become better understood by reference to the following detailed description when considered in connection with the accompanying drawings in which:

FIG. 2 is an elevation view of the cutting and handling apparatus taken along the line 2—2 of FIG. 1;

FIG. 3 is a schematic diagram of the electrical control circuit for the cutting and handling apparatus;

FIG. 4 is a diagrammatic view of a double block size sheet of glass G scored along line SL indicating the two nested single blocks SB1 and SB2 oriented at 180 degrees from each other and to be obtained from sheet G; and FIG. 5 is a legend for the electrical control circuit of FIG. 3.

Figure 1:
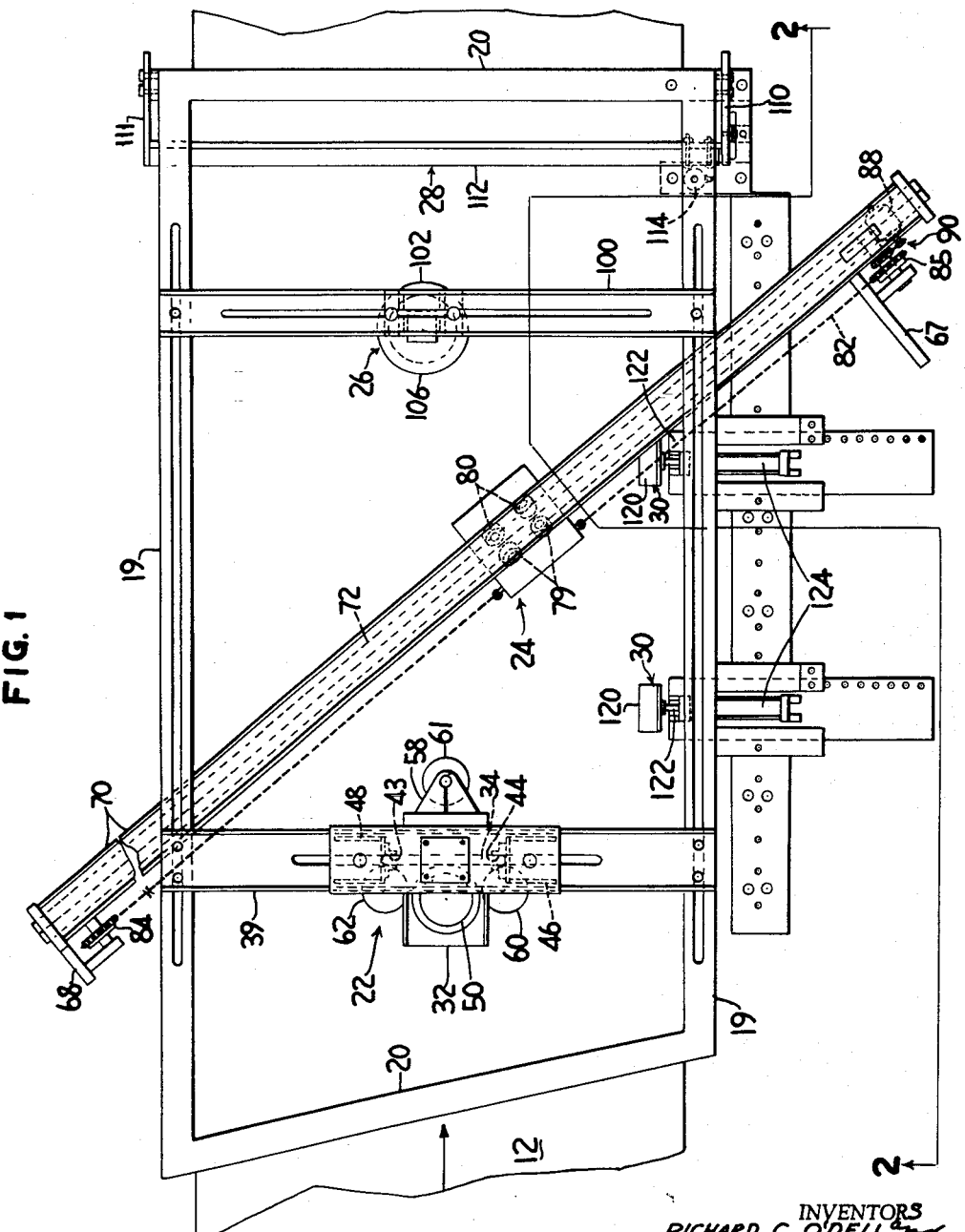
FIG. 1 is a plan view of cutting and handling apparatus, as constructed in accordance with this invention, and located along a glass fabricating line.

Referring now to FIGS. 1 and 2, there is illustrated apparatus for cutting and handling glass sheets at a processing station intermediate a glass fabricating line, which apparatus is adapted to receive double block size glass sheets, such as sheets G in FIG. 4, on a conveyor for cutting into individual block sizes, such as SB1 and SB2, and properly orienting the block sizes for further processing at subsequent stations along the fabricating line. The essential framework of the apparatus includes a conveyor, indicated generally at 14, upon which the conveyor belt 12 is supported and which also supports the rectilinear framework 16 of the cutting and handling station. This framework includes stanchions 18 supported by the conveyor of framework 14, an upper level of longitudinally extending beams 19, a lower level of longitudinally extending beams 20, and transversely extending cross braces 21 supported by the stanchions 18. Supported above the conveyor on the framework 16 of the cutting and handling station are a handling unit 22, a cutting unit 24, a glass holddown unit 26, and a glass retarding unit 28. Beside the conveyor belt 12 and supported on the framework of the conveyor are two glass positioners 30 spaced from each other longitudinally of the conveying path.

Referring now to handling unit 22, a vertically movable platform 32 upon which a rotary air cylinder motor 50 and a vacuum cup assembly are mounted is fastened to and supported by a vertical plane 34 suitably attached to and suspended for vertical movement of vertically movable piston rod 36 of air cylinder 38. Air cylinder 38 is supported above and centrally of the conveyor belt 12 by a transversely extending channel brace 39 fastened to longitudinally extending beams 19 of rectilinear framework 16. Grooves 43 and 44 formed on the inwardly facing surfaces of vertical channels 46 and 48, which depend from the supporting channel brace 39, receive and guide the vertically disposed edges of plate 34.

The rotary air cylinder motor 50 supported on horizontal plate 32 has a drive shaft 51 extending through plate 32. A gear 52 is suitably attached, as by a key or pin (not shown) to shaft 51 below plate 32. A downwardly extending vertical shaft 54 is supported at one end from horizontal plate 32 in spaced relationship to motor drive shaft 51, and a gear 56 is suitably fixed to shaft 54. Gear 56 meshes with and is driven by pinion gear 52.

A vacuum cup support plate 58 is fixedly attached to the distal end of vertical shaft 54 for rotation therewith. Three vertically aligned and horizontally spaced vacuum cups 60, 61 and 62 are supported on the lower surface of horizontal support plate 58 in a position to engage an upper surface of a horizontally disposed sheet of glass. These vacuum cups communicate with a suitabl vacuum source (not shown) and, alternately, a source of air pressure (not shown) through individual connecting conduits 65, two of which are shown in FIG. 2. These conduits communicate with the vacuum source and air pressure source through shaft 54 and flexible conduit 65. Control of the vacuum and air blow off to cups 60, 61 and 62 is governed by a double solenoid, maintain position, four-way valve in a manner to be described in more detail in connection with the control circuit.

Motor 50 includes stops (not shown) which limit the extent to which driving gear 52, and hence driven gear 56, is rotated. For the present purposes gear 56, and hence vacuum cups of support plate 58, are rotatable through 180 degrees in a horizontal plane. The motor 50 is operated in a forward or reverse direction between the stop settings above mentioned in response to a timer operated solenoid valve controlled by an electrical circuit yet to be described.

Vertical movement of support plate 32, and hence the vacuum cups 60, 61 and 62, is provided by the actuation of air cylinder 38 under the control of a conventional four-way, single solenoid, spring return valve controlled by suitable timer circuitry in a manner later to be described.

A conventional cutter unit 24 is positioned downstream of the handling unit 22 and extends across the conveying path at an angle other than 90 degrees thereto selected to accommodate the block size shape desired. To this end a horizontal support channel 70 is supported on each side of the conveying path by longitudinally extending beams 20 of rectilinear framework 16. Channel 70 may be fastened or clamped by suitable means (not shown) at the desired angle to the conveying path as well as at the desired distance from the handling unit 22. Suspended from support channel 70 by hanger plates 67 and 68 and similarly horizontally disposed across the conveying path is a square, single rail, cutter car track 72.

A cutter mechanism of conventional type, including a carriage framework 78 supported from cutter car track 72 by two pairs of rollers 79 and 80, a cutterhead bracket 76 suspended from a carriage framework 78, and a cutter wheel 74 journalled in a pillow post (not shown), is carried by track 72 for movement across the conveying path to score a glass sheet in the cutting and handling station. A chain 82, connected at each end to carriage framework 78, and engaging sprockets 84 and 85 suitably mounted on the hangers 67 and 68 from which the cutter car track 72 is supported moves the cutter mechanism along track 72. Electric motor 88 drives sprocket 85 through a suitable chain and sprocket drive linkage 90. Limit switches (not shown) at each end of track 72 and having contacts LSF1, LSF2 and LSR1, LSR2 (FIG. 3) control, through associated circuitry, the direction and extent of travel of cutter carriage 78 along track 72.

Located beneath and inwardly of the marginal edge of conveyor belt 12 is a vertically disposed air cylinder 94 having a piston rod 96 upwardly movable an extent sufficient to lift the conveying belt and a supported glass sheet slightly above the general level of the conveying path. Cylinder 94 is suitably mounted to conveyor framework 16 and positioned so that piston rod 96 applies a lifting moment to a scored glass sheet supported on the conveyor directly beneath the score line.

On the opposite side of cutter unit 24 along the conveyor belt 12 is the glass holddown unit 26. Supporting this unit is a horizontal channel member 100 extending transversely of the conveyor and supported upon longitudinally extending beams 19 of the rectilinear framework 16. Centrally of the conveyor belt 12 and vertically depending from horizontal channel member 100 is an I-beam support bracket 102 suitably fastened at its upper end to channel member 100. The lower end of support bracket 102 terminates above and in spaced relationship to the conveying belt 12. A vertically disposed air cylinder 104 is suitably fastened to the web portion of I-beam support bracket 102. Piston rod 103 extends from the lower end of the cylinder 104. A suitable glass contacting shoe 106 is attached to the end of the air cylinder piston rod 103 and is movable between two vertically spaced positions, an upper position being above the path of glass travel and a lower position in which the shoe is in contact with a sheet of glass supported on the conveyor belt 12. Movement of the air cylinder piston is controlled in a known manner by a four-way, single solenoid, spring return valve.

Downstream in the direction of glass travel from the glass holddown unit 26 is the glass retarding unit 28. Support brackets 110 and 111 are mounted adjacent conveyor belt 12 on stanchions 18 of rectilinear framework 16 of the cutting and handling station. Brackets 110 and 111 are fastened at one of their ends to stanchions 18 and are horizontally disposed and extend longitudinally along the conveying path. Fastened adjacent the unsupported end of brackets 110 and 111 and extending horizontally between the brackets transversely across conveying belt 12 is a stop member 112 vertically movable between an upper position out of the path of glass being conveyed on belt 12 and a lower position at which the stop member obstructs movement of a glass sheet being carried on conveyor belt 12. Movement of stop member 112 between the upper and lower positions is provided by an air cylinder 114 which is fixedly attached to member 112 and which moves stop member 112 vertically in response to relative movement between the air cylinder piston and the air cylinder. Because the piston rod of cylinder 114 abuts the immovable conveyor frame, the cylinder moves upwardly, taking with it the stop member 112. Adjustable stop screw 116 mounted on an L-bracket 117 attached to movable stop 112 limits upward movement of stop member 112 by contact with the conveyor frame. Operation of air cylinder 114 is controlled by a four-way, single solenoid, spring return valve in a manner well known in the art.

A pair of glass positioners 30 are provided, each spaced from the other in a longitudinal direction along the conveyor on one side of the belt. Each has a shoe 120 positioned just above conveyor belt 12 and adapted to contact a longitudinally extending edge of a glass sheet supported on conveyor belt 12. The shoes 120 are attached to piston rods 122 of air cylinders 124 which are horizontally disposed and aligned in a direction transversely of the conveyor belt travel so that piston rods 122 may be extended across the conveyor belt 12 at right angles to the direction of glass travel. Air cylinders 124 are each of similar construction and are positioned in proper alignment so that when shoes 120 are moved to their outermost position in response to the extension of piston rods 122 they will define a reference line, the direction of which will be parallel to the path of travel of conveyor belt 12. In this manner a longitudinally extending edge of the glass sheet may be accurately positioned for the cutting operation. Both air cylinders 124 are supplied with air under the control of one conventional four-way, single solenoid, spring return valve.

In operation, the cutting and handling station is one of several operating stations along a continuous belt conveyor. The belt is moved forward intermittently under the control of a master electrical control circuit to define a series of operating cycles common to the entire line. Thus, the distance the belt moves in each cycle and the time during which it is stationary in each cycle is compatible with the operation of all operating stations on the fabricating line.

Apart from the specific circuitry that controls the operation of the cutting and handling mechanism and which will be described in detail below, the general sequence of operation is as follows:

The conveyor belt advances in response to the overall control of the fabricating line and carries a double block size glass sheet into the cutting and handling station. The front stop member 112 is lowered and engages the leading edge of the glass sheet prior to the stopping of the conveyor belt, thereby properly locating the leading edge of the glass sheet and substantially squaring the glass sheet with respect to the conveyor travel. Air cylinders 124 are then actuated extending piston rods 122 and squaring shoes 120 tranversely of the conveyor belt and into contact with a longitudinally extending edge of the glass sheet. The shoes continue moving a distance sufficiently great to assure that each shoe contacts the longitudinal edge at spaced positions to properly locate the longitudinal edge of the glass sheet along a predetermined reference line defined by the extent to which the shoes 120 are moved. Movement of the squaring members takes place only after the stop member 114 has been lowered and the conveyor belt has been stopped.

Next, the cutter carriage 78 is driven along cutter car track 72 to score the glass sheet with cutter wheel 74. Because the glass may be scored with the carriage moving in either direction, the carriage is moved in only one direction during cutting cycle.

During the scoring operation the vacuum cup support plate 58 is rotated in its raised position through 180 degrees. After the scoring operation is completed the vacuum cups 60, 61 and 62 and the holddown shoe 106 are lowered into contact with the second glass sheet to apply a downward moment thereto, and piston rod 96 of air cylinder 94 is raised to apply a lifting moment to the glass sheet beneath the score line. In this manner the score line is run, separating the double block size sheet of glass into two separate block size sheets. At the same time, the vacuum cups on the handling unit 22 become attached to the upstream portion of the severed sheet.

At this point, the suction cup assembly and holddown shoe 106 are raised and the vacuum cup assembly is rotated 180 degrees in the opposite direction of its original rotation and returns to its original position. This lifts the upstream or trailing portion of the glass sheet which has been cut from the double block size sheet from the conveyor belt and rotates it so that it is oriented in the same relative position as the downstream or leading portion of the glass sheet which is still on the conveyor.

Now, the conveyor belt is advanced the fixed distance of a second cycle of the fabricating line, thereby moving the leading portion of the sheet downstream of the cutting and handling station to the next operating station, for example, to a pattern scorer. Before movement of the belt stops, the lifted and rotated portion of the original glass sheet is dropped on the conveyor belt in time to be carried to the position previously occupied by the leading portion. Note that the cutting and handling unit remains idle during this cycle. The next belt cycle will then be repetitive of the first cycle, moving the second portion of the previous double block size sheet of glass out of the cutting and handling station and moving a new double block size sheet of glass into the cutting and handling station.

Referring now to the relay control circuity of FIG. 3, there are two power lines PL1 and PL2 across which are shown the relay subcircuits designated by line numbers. Relay operated switches have been designated by the reference numeral of the actuating relay plus a suffix to differentiate the contacts from each other. The reference numeral in parentheses after the contact designation indicates the subcircuit in which the contact is located.

Lines L1 and L2 include the starting controls, viz, control switch SW which either turns the cutting and handling apparatus off or allows it to operate in response to a manual start button MSB or a conveyor belt interlock contact CBI which is closed when the conveyor belt motor is started.

In the operation to be described, the conveyor belt is about to begin a new cycle by moving a predetermined distance. A complete cycle of the cutting and handling apparatus spans two complete cycles or movements of the conveyor belt. As previously explained, in one cycle of the belt the glass is moved into position, scored, broken, lifted and rotated 180 degrees. In the next cycle of the belt, the leading or downstream separated portion of the glass is moved out of the station and the lifted portion is dropped to the belt.

Assuming the switch SW to be on, all coil relays to be de-energized and all contacts to be in the positions they normally occupy (as shown in FIG. 3) when their associated relays are de-energized, the following discussion will begin at the beginning of a belt cycle but in the middle of the cutting and handling cycle, i.e., with a sheet of glass already rotated and held in raised position by vacuum cups 60, 61 and 62, and the conveyor belt stopped. It should be noted that when solenoid SV2 controlling air cylinders 124 and solenoid SV4 controlling air cylinders 38, 94 and 104 are de-energized, the piston rods are in retracted position. When solenoid SV1 controlling air cylinder 114 is de-energized, the piston rod is extended. Because a double solenoid, maintain position, four-way valve controls both the vacuum and the air blow off, one or the other is always in communication with the vacuum cups. At this point the vacuum is connected.

Conveyor belt 12 starts in response to the control circuit in command of the fabrication line. This closes conveyor belt interlock contact CBI of the cutting and handling station control circuit. Coil relay CR1 is thereby energized, closing contacts CR1–1 (L3) and opening CR1–2 (L5). The closing of contact CR1–1 actuates coil relay CR2, and the opening of contact CR1–2 prevents the energization of coil CR3.

Coil relay CR2 closes contact CR2–1 (L4) which holds the relay actuated and also closes contacts CR2–2 (L5) and CR2–3 (L7). With CR2–3 (L7) closed and CR3–2 (L7) remaining closed, coil TCR of a pneumatic time delay is energized to close time delay contact TCR–1 after a suitable delay, at which time solenoid SV5B of the double solenoid, maintain position, four-way valve controlling the vacuum and air blow off of vacuum cup 60, 61 and 62 is energized, shutting off the vacuum and producing a flow of air to the cups to release the supported glass sheet which falls to the conveyor belt.

A motor driven sequence timer T (L8, L9) that controls the handling and cutting operations in the alternate cycle of the conveyor 12 is not energized because contact CR3–3 (L8) remains open. Neither were positioning members 30 actuated because contact CR1–4 (L15) opened when coil relay CR1 was energized.

Belt 12 is then stopped by the master control of the fabricating line and contact CBI opens, de-energizing coil relay CR1. This opens contact CR1–1 (L3) and closes contact CR1–2 (L5). However, coil relay CR2 remains energized by virtue of the holding circuit of line L4 and thus contact CR2–2 (L5) remains closed. As a result, coil relay CR3 is energized, closing contact CR3–1 (L6) which holds CR3 energized, opening contact CR3–2 (L7) to de-energize time delay coil TCR and closing contact CR3–3 (L8) to permit energization of motor driven sequence timer T upon the start of the next belt cycle during which the timer T will control the operation of the cutting and handling station. Timer T has a plurality of contacts which are adjustable as to the time at which they will open and close.

When belt 12 is started again, contact CBI is closed, actuating coil relay CR1 and closing contact CR1–3, thereby energizing timer T which begins to control the operation in a predetermined time sequence.

The first contact closed by the timer T is T–1 (L9) which maintains the timer energized. This is necessary because belt 12 stops and relay CR1 drops out soon after the belt has advanced a new double block size sheet of glass into the cutting and handling station.

When timer T closes its second contact T–2 (14), solenoid SV1 actuates the associated four-way valve to reverse the flow of air to cylinder 114 and lower stop 112 of glass retarding unit 28 into the path of the glass on conveyor 12. Shortly after the glass contacts stop 112, the conveyor stops.

As soon as conveyor 12 stops, relay CR1 is de-energized, closing normally closed contact CR1–4 (L15). This completes a circuit through lines L14 and L15 and energizes solenoid SV2 of a single solenoid, spring return, four-way valve which reverses the flow of air to cylinders 124 of glass positioners 30 to extend shoes 129, thus positioning the glass sheet along a predetermined reference line.

Timer T next closes contact T–3 (L11) to energize the forward or reverse starter motor coils CMF or CMR, respectively, of reversible cutter drive motor 88. Whether the forward coil CMF or reverse coil CMR is energized is dependent upon the location of the cutter carriage. A limit switch having two contacts LSF1 (L10), normally open, and LSF2 (L12), normally closed, at one end of the path of travel of the cutter carriage and a limit switch having two contacts LSR1 (L13), normally open, and LSR2 (L12), normally closed, is at the other end. The presence of carriage 78 at either end of track 72 closes the normally open number 1 contact of the applicable switch and opens the normally closed number 2 contact. The opening of the number 2 contact prevents energization of the motor until timer contact T–3 closes. At this time, then, a circuit is completed through contact T–3 (L11), either one of limit switches LSF1 (L10) or LSR1 (L13), and either of normally closed contacts CMR–1 (L11) and CMF–1 (L12) to energize coil CMF or CMR. Assuming the motor to be in position to close LSF1, thus energizing coil CMF, contact CMF–2 (L11) closes to hold coil CMF energized after LSF1 opens and contact CMF–1 (L12) opens to prevent coil CMR from being energized at any time coil CMF is energized. The motor now drives carriage 78 to score the sheet.

Contact point T–3 (L11) is timed open, limit switch contact LSF1 opens and contact LSF2 closes after cutter carriage 78 begins its travel along track 72 to score the glass sheet. Coil CMF is maintained energized through closed limit switches LSF2 (L12) and LSR (L12), closed contact CMF–2 (L11) and normally closed contact CMR–1 (L11).

When the cutter carriage reaches the other end of track 72, limit switch contact LSR2 is opened, de-energizing motor coil CMF and stopping the cutter travel. Limit switch contact LSR1 is simultaneously closed in preparation for the next cutting cycle, at which time the motor will be driven in reverse.

During the scoring operation, timer T closes timer contact T–4 (L16) in the circuit of solenoid SV3 of the solenoid valve that controls rotary air cylinder motor 50 to rotate vacuum cup support plate 58 180 degrees. It will be understood that normally closed contact CR2–4 (L16) is closed when motor coil CMF or CMR is energized, due to the opening of normally closed contact CMF–1 (L3) or CMR–1 (L3) in the circuit of coil relay CR2.

After vacuum cup support plate 58 has been rotated, timer contact T–5 (L17) is closed, energizing solenoids SV4 and SV5A. Solenoid SV4 controls a four-way single solenoid, spring return valve that simultaneously reverses the flow of air to air cylinders 38, 104 and 94, extending their respective piston rods. This lowers the vacuum cups 60, 61 and 62 and the holddown shoe 106 to the glass sheet, applying a downward moment on each side of the score line, and raises piston rod 96 to apply an upward moment to the glass sheet beneath the scored line, thereby running the score to separate the double block size sheet into two separate single block size sheets. Solenoid SV5A simultaneously actuates the double solenoid, maintain position, valve which connects the vacuum cups with either an air or vacuum source to apply a vacuum to cups 60, 61 and 62.

Timer contact point T–5 now opens, returning the piston rods of air cylinders 38, 94 and 104 to their withdrawn position. Because the solenoid valve connecting the vacuum to cups 60, 61 and 62 maintains its position, even though the solenoid is de-energized, the vacuum source remains in communication with the cups, and the upstream or trailing portion of the original double block size glass sheet is lifted from the conveyor belt 12.

Timer T now opens contact point T–4 (L16) deenergizing solenoid SC3, causing motor 50 to rotate the vacuum cup assembly back 180 degrees to its original position. Contact point T–1 is then opened, turning off timer T. All coil relays are de-energized and the conveyor belt 12 is about to start the next cycle.

While in the foregoing disclosure a preferred embodiment of the invention has been disclosed, numerous modifications or alterations may be made therein without departing from the spirit and scope of the invention as set forth in the appended claim.

We claim:
1. Apparatus for cutting and handling glass which comprises a cutting and handling station, means to convey glass sheets to and from said cutting and handling station and to support said sheets in a stationary position at said station while the sheets are cut, means at the cutting and handling station to position said sheets in a predetermined location, means at said cutting and handling station to cut said sheets into two pieces along a predetermined line at an angle other than 90 degrees to the sides of said glass sheets, handling means to engage, lift from the conveying means, rotate and replace to the conveying means one of said pieces, and control means for moving the other of said pieces on said conveyor means from said cutting and handling station while said one piece is lifted, so as to space the two sheets from each other, on the conveying means.

2. Apparatus for cutting and handling glass comprising a cutting unit, means for conveying a sheet of glass to said cutting unit and for supporting said sheet at the cutting unit, means for positioning said sheet at said cutting unit in a predetermined location, a guide rail bridged across said conveying means and above said predetermined location, glass scoring means movable along said guide rail for scoring a glass sheet positioned at said cutting unit along a predetermined line, means for separating said glass sheet into two pieces along said scored line, and handling means for lifting one of said separated pieces, rotating it through substantially 180 degrees in a horizontal plane and returning it to said conveying means.

3. Apparatus for cutting and handling glass comprising a glass cutting unit including means for scoring a glass sheet from one side to another at an angle other than 90 degrees to said sides, means for conveying a sheet of glass to said glass cutting unit and for supporting said sheet at the unit, means at said station for positioning said sheet in a predetermined location relative to said scoring means, means for separating a scored glass sheet into two pieces along a scored line, and handling means for lifting one of said separated pieces, rotating it through substantially 180 degrees in a horizontal plane and returning it to said conveying means.

4. Apparatus for cutting and handling glass which comprises a cutting unit for separating a glass sheet into at least two similarly shaped but differently oriented pieces, means for conveying a sheet of glass to the cutting unit and for supporting said sheet at the cutting unit, and handling means for engaging a portion of the glass sheet and for lifting a separated piece of the glass sheet from said conveying means and for rotating said piece a predetermined amount in a horizontal plane, and for thereafter replacing said piece on said conveying means.

5. The apparatus of claim 4 wherein the cutting unit includes a guide rail bridged across said conveying means and a cutter carriage, including a glass scoring wheel, supported on said guide rail and movable therealong to score a glass sheet positioned at said unit.

6. The apparatus of claim 5 further including means for applying a lifting moment beneath the sheet of glass adjacent a portion of the scored line.

7. The apparatus of claim 4 further including means adjacent said conveying means and adapted to contact edges of the glass sheet for controlling the position of said sheet at said cutting station.

8. The apparatus of claim 7 wherein the means for positioning said sheet includes a front stop member movable into and out of the path of glass travel along said conveying means, and a pair of squaring members, longitudinally aligned and transversely movable relative to said conveying means and adapted to contact spaced edge portions of the glass sheet.

9. The apparatus of claim 4 further including glass holddown means separate from said handling means and positioned on an opposite side of the glass separating means from said handling means for engaging an upper surface of the glass sheet while at said cutting station and for resisting movement of the glass sheet.

10. Apparatus for fabricating glass which comprises a conveyor intermittently movable in a series of cycles and adapted to carry glass sheets along a fabricating line; a cutting and handling station adjacent said conveyor for separating said sheets into at least two portions and for rotating one of said portions through 180 degrees and then replacing it on said conveyor, said station including means to position a glass sheet in a predetermined location on said conveyor, a vertically movable, horizontally rotatable vacuum cup assembly above said conveyor, glass cutting means movable transversely across said conveyor at an angle other than 90 degrees to the path of movement of said glass, and means to snap a scored glass sheet; and means, sensitive to the intermittent movement of said conveyor, to control the operation of said positioning means, vacuum cup assembly, cutting means and snapping means in a predetermined sequence.

References Cited by the Examiner

UNITED STATES PATENTS

| | | | |
|---|---|---|---|
| 1,377,320 | 5/21 | Crowley | 225—2 |
| 1,665,864 | 4/28 | Templeton | 225—94 X |
| 2,019,973 | 11/35 | Hormel | 198—33.2 |
| 2,834,156 | 5/58 | Oberlin | 225—96.5 |
| 3,047,123 | 7/62 | McKay | 198—33.2 |

ANDREW R. JUHASZ, *Primary Examiner.*